Patented Mar. 30, 1937

2,075,340

UNITED STATES PATENT OFFICE 2,075,340

CONDENSATION PRODUCTS AND PROCESS

Ludwig Cserny, Wiesbaden, Germany, assignor to The Resinous Products & Chemical Company, Philadelphia, Pa.

No Drawing. Application January 10, 1935, Serial No. 1,171. In Germany January 13, 1934

11 Claims. (Cl. 154—2)

This invention relates to a process for the manufacture of shaped articles for hardenable condensation products. The condensation products which are particularly suitable for carrying out this invention are those which are made by the joint condensation of an acid amide and a phenol or a hardenable or unhardenable phenol aldehyde condensation product with formaldehyde. The products so obtained are practically colorless and transparent and after final hardening are insoluble and infusible.

In general the process consists in hardening the joint condensation product to such a degree that it will form a firm gel at ordinary temperatures which can be cut into thin slices by any suitable cutting machine. These slices are then superposed on each other, placed in the cavity of a mold and united to a homogeneous block by pressure or pressure and heat.

In this way results may be obtained which cannot be obtained by the well known methods of casting such materials. Castable artificial resins in the so-called B-state can only be firmly united to a homogeneous mass with great difficulty and if the resin is in the C-state it is impossible to unite two pieces in this way. If for instance, thin sheets of an artificial resin which is so condensed that it is between the B and C states are pressed together, as indicated above, the result is a bundle of weakly adhering sheets which can be separated without any great exertion. In this case a welding or uniting of the sheets does not take place to a practical degree.

It has now been found that condensation products of acid amides and aldehydes, particularly urea or thiourea and formaldehyde when condensed to a gel which may be cut at ordinary or elevated temperatures, may be welded or fluxed together in this manner. It has also been found, unexpectedly, that weldable and moldable products are obtained when mixtures of acid amide-formaldehyde condensation products with phenols, hardenable or unhardenable phenol-carbonyl condensation products, or mixtures of aliphatic or aromatic acid amides and hardenable phenol-carbonyl condensation products are hardened by heat, preferably in an acid medium, until a gel is formed which may be easily cut.

The gel thus obtained may be welded. With the help of a suitable cutting machine, thin plates may be cut from this gel which may then be welded together under the action of heat and pressure to homogeneous plates or blocks. These blocks can then be cut again into suitable plates, rods, and the like. It is evident that by welding together different colored pieces effects may be obtained which are not obtainable with castable resins. Naturally, it is possible to cut the gel in forms other than sheets, such for instance as small blocks and then to weld these together. The welded articles or blocks can then be hardened by the action of heat alone or heat and pressure.

In spite of the fact that these gels are hardened to a practical degree, they may still be molded. If, for instance, a small cube of the hardened gel is placed in a mold and heated under pressure, the resulting article assumes the exact contours of the mold, such for instance, as an ash tray. The gel may also be worked in a manner similar to glass. It may be welded to other materials such as wood, metal, glass, etc. For example, a sheet of the gel approximately 1 mm. thick may be placed on a roughened wood surface and fastened thereto by means of heat and pressure. In other words, this gel may be worked in a manner similar to that employed for molding celluloid because it is very similar to celluloid in its physical properties. It is, however, not flammable. This gel may also be ground to a powder and molded in the usual manner.

One particular advantage of the products obtained according to the new process is that they possess high elasticity and toughness.

Example 1

To 1000 parts of a condensate from one mol. of phenol and 2½ mols of formaldehyde, 1000 parts of a 30% urea solution is added and the solvent removed by vacuum distillation. The resin is then poured into a mold and heated between 60 and 100° C. until hardened to a gel. The gel thus obtained is cut into pieces of any desired shape or size and these are then pressed in a mold at 50 to 100° C. and 60 kg./cm.$^2$ for 1 hour. The article so obtained is completely homogeneous.

Example 2

In place of the urea in Example 1, lactamid or p-toluol sulfonamide may be used and the process carried out as described. The molded article obtained in this case is also completely homogeneous and may be subsequently hardened by heating.

Example 3

2 g. mols of urea and 4 g. mols of formaldehyde (30%) and 10 cc. of n-NaOH are condensed for 10 minutes under a reflux condenser after which one gram mol. of phenol is added and the boiling continued for 30 minutes longer. 14 cc. of n-HCl is added, the solution boiled for 5 minutes and then the water distilled under reduced pressure at 40 to 50° C. In this way a semi-crystalline white substance having a sinter point of approximately 70° C. is obtained. On long distillation and at increased temperature the substance loses the ability to sinter. The powdered product may be pressed at 80° C. and 60 kg./cm.$^2$ whereby a completely transparent practically colorless article of good strength is obtained.

*Example 4*

The end product obtained in Example 3 is molded at 150° C. and 100 kg./cm.$^2$ for 1 minute for each millimeter of wall thickness. The molded article is transparent, practically colorless and of good mechanical strength. The finest contours of the mold are reproduced exactly on the finished article.

*Example 5*

1 mol. of phenol and 2 mols of formaldehyde are condensed in a strongly alkaline solution and subsequently neutralized or acidified and subjected to vacuum distillation to remove the water.

1 mol. of urea and 3 g. mols of formaldehyde are condensed in an alkaline medium and dehydrated under vacuum.

100 kg. of each of the condensates so obtained are mixed together at about 60° C. A very vigorous reaction and separation of water take place. After completion of this reaction the mass is poured into molds and hardened at 50 to 90° C. until it may be cut, following which it is cut into sheets with the help of a machine. These sheets are then placed in the cavity of a celluloid block press, one on top of the other and heated for one hour at a pressure of 30 to 60 kg./cm.$^2$. The block thus obtained is absolutely homogeneous.

*Example 6*

100 kg. of the phenolic condensate and 25 kg. of the urea condensate obtained according to Example 5 are mixed and treated exactly as given in Example 5. The resulting block is likewise completely homogeneous.

The finished block of material resulting from this process may be cut, machined and polished to any desired shape. When all of the sheets pressed are of the same color, no particular care is necessary to avoid flowing of the material under pressure. On the other hand, if the alternate sheets are of different colors, care must be taken that the pressure applied is not sufficient to cause any very great flow of the material at the temperature employed. These conditions of welding sheets of various colors together may be determined experimentally for any given condensation product and will vary somewhat according to the composition of such condensation products. By operating under the proper conditions of temperature and pressure the material from one sheet does not flow into the material of the adjoining sheets and thus a sharp line of demarcation between the various colors is obtained in the finished article. The above examples are given by way of illustration only, since the invention may be otherwise practiced within the scope of the following claims:

I claim:—

1. The process which comprises condensing a mixture of an acid amide, formaldehyde and one of the group consisting of phenols and phenol-carbonyl condensation products to a gel capable of being sliced, cutting said gel into sheets, preparing similar sheets of a like gel having different color characteristics, superposing sheets of said gels having alternately different color characteristics, welding said sheets together by pressure at temperatures of from about 50° C. to about 100° C. and completing the condensation at the same temperatures.

2. The process which comprises condensing a mixture of an acid amide, formaldehyde and one of the group consisting of phenols and phenol-carbonyl condensation products to a gel capable of being sliced, cutting said gel into pieces of predetermined shape, preparing similar pieces of a like gel having different color characteristics, assembling said pieces into a design, welding said pieces together by pressure at temperatures of from about 50° C. to about 100° C. and completing the condensation at the same temperatures.

3. The process which comprises condensing a mixture of urea, formaldehyde and one of the group consisting of phenols and phenol-carbonyl condensation products to a gel capable of being sliced, cutting said gel into pieces of predetermined shape, preparing similar pieces of a like gel having different color characteristics, assembling said pieces into a design, welding said pieces together by pressure at temperatures of from about 50° C. to about 100° C. and completing the condensation at the same temperatures.

4. The process which comprises condensing a mixture of urea, formaldehyde and phenol to a gel capable of being sliced, cutting said gel into pieces of predetermined shape, preparing similar pieces of a like gel having different color characteristics, assembling said pieces into a design, welding said pieces together by pressure at temperatures of from about 50° C. to about 100° C. and completing the condensation at the same temperatures.

5. The process which comprises condensing a mixture of lactamide, formaldehyde and one of the group consisting of phenols and phenol-carbonyl condensation products to a gel capable of being sliced, cutting said gel into pieces of predetermined shape, preparing similar pieces of a like gel having different color characteristics, assembling said pieces into a design, welding said pieces together by pressure at temperatures of from about 50° C. to about 100° C. and completing the condensation at the same temperatures.

6. The process which comprises condensing a mixture of p-toluene-sulfonamide, formaldehyde and one of the group consisting of phenols and phenol-carbonyl condensation products to a gel capable of being sliced, cutting said gel into pieces of predetermined shape, preparing similar pieces of a like gel having different color characteristics, assembling said pieces into a design, welding said pieces together by pressure at temperatures of from about 50° C. to about 100° C. and completing the condensation at the same temperatures.

7. An article composed of autogenously welded pieces of a joint condensation product of an acid amide and formaldehyde with one of the group consisting of phenols and phenol-carbonyl condensation products, said pieces having different color characteristics.

8. An article composed of autogenously welded pieces of a joint condensation product of urea and formaldehyde with one of the group consisting of phenols and phenol-carbonyl condensation products, said pieces having different color characteristics.

9. An article composed of autogenously welded pieces of a joint condensation product of urea, phenol and formaldehyde, said pieces having different color characteristics.

10. An article composed of autogenously welded pieces of a joint condensation product of lactamide and formaldehyde with one of the group consisting of phenols and phenol-carbonyl condensation products, said pieces having different color characteristics.

11. An article composed of autogenously welded pieces of a joint condensation product of p-toluol sulfonamide and formaldehyde with one of the group consisting of phenols and phenol-carbonyl condensation products, said pieces having different color characteristics.

LUDWIG CSERNY.